United States Patent
Kuroba et al.

(10) Patent No.: US 11,603,159 B2
(45) Date of Patent: Mar. 14, 2023

(54) STRADDLE TYPE VEHICLE

(71) Applicant: HONDA MOTOR CO., LTD., Tokyo (JP)

(72) Inventors: Yoshiyuki Kuroba, Wako (JP); Tsuyoshi Kumasaka, Wako (JP); Kiyoshi Katagiri, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/025,359

(22) Filed: Sep. 18, 2020

(65) Prior Publication Data
US 2021/0078657 A1 Mar. 18, 2021

Related U.S. Application Data

(63) Continuation of application No. PCT/JP2018/013417, filed on Mar. 29, 2018.

(51) Int. Cl.
*B62J 6/04* (2020.01)
*B62K 11/10* (2006.01)
(Continued)

(52) U.S. Cl.
CPC ............ *B62K 11/10* (2013.01); *B60Q 1/0023* (2013.01); *B62J 6/045* (2020.02); *B62J 6/20* (2013.01);
(Continued)

(58) Field of Classification Search
CPC ... F21W 2107/17; F21S 43/26; B60Q 1/0023; B60Q 6/045; B62J 45/40; B62J 6/04
See application file for complete search history.

(56) References Cited

U.S. PATENT DOCUMENTS 6,550,949 B1 * 4/2003 Bauer .................. B60Q 1/0023
362/800
7,204,624 B2 4/2007 Katagiri
(Continued)

FOREIGN PATENT DOCUMENTS

DE 102011002894 A1 7/2012
DE 102013222598 A1 5/2015
(Continued)

OTHER PUBLICATIONS

International Search Report for PCT/JP2018/013417 dated May 22, 2018.
IPRP for PCT/JP2018/013417 mailed Jan. 14, 2020.

*Primary Examiner* — Julie A Bannan
(74) *Attorney, Agent, or Firm* — Thomas | Horstemeyer, LLP

(57) ABSTRACT

The present invention provides a straddle type vehicle, comprising: a taillight disposed in a rear portion of a vehicle and configured to emit light to rearward of the vehicle and a detection unit configured to emit radio waves and detect surrounding conditions behind the vehicle, wherein the taillight includes a light source and a housing for accommodating the light source, the detection unit is provided inside the housing, the housing has a transmitting portion that includes a first region for transmitting light emitted from the light source and a second region for transmitting the radio waves emitted from the detection unit, and the first region has an uneven shape for diffusing the light emitted from the light source, and the second region does not have the uneven shape.

8 Claims, 6 Drawing Sheets

(51) Int. Cl.
  *B62J 6/20*      (2006.01)
  *G01S 13/931*    (2020.01)
  *B62J 6/045*     (2020.01)
  *B60Q 1/00*      (2006.01)
  *F21S 43/20*     (2018.01)
  *F21W 107/17*    (2018.01)

(52) U.S. Cl.
  CPC ............ *F21S 43/26* (2018.01); *G01S 13/931*
       (2013.01); *F21W 2107/17* (2018.01); *G01S*
       *2013/9315* (2020.01); *G01S 2013/9327*
       (2020.01)

(56) References Cited

U.S. PATENT DOCUMENTS

| | | | | |
|---|---|---|---|---|
| 2004/0201463 A1* | 10/2004 | Ko | ................ | B60Q 1/2607 |
| | | | | 340/468 |
| 2005/0122729 A1 | 6/2005 | Katagiri | | |
| 2005/0275521 A1* | 12/2005 | Li | ................ | B60Q 1/0023 |
| | | | | 340/436 |
| 2007/0086203 A1* | 4/2007 | Nakano | ................ | B62J 6/023 |
| | | | | 362/514 |
| 2008/0180965 A1* | 7/2008 | Nakamura | ................ | B60Q 1/0023 |
| | | | | 362/507 |
| 2016/0121791 A1* | 5/2016 | Shimizu | ................ | G08G 1/166 |
| | | | | 340/435 |
| 2017/0101147 A1 | 4/2017 | Hasegawa | | |
| 2018/0229645 A1* | 8/2018 | Hara | ................ | B60Q 1/0023 |

FOREIGN PATENT DOCUMENTS

| | | |
|---|---|---|
| JP | 2005119374 A | 5/2005 |
| JP | 2007131152 A | 5/2007 |
| JP | 2010030471 A | 2/2010 |
| JP | 2017074820 A | 4/2017 |
| JP | 2017132278 A | 8/2017 |
| JP | 2017171223 A | 9/2017 |
| WO | 2015067403 A1 | 5/2015 |
| WO | 2019186942 A1 | 10/2019 |

\* cited by examiner

STRADDLE TYPE VEHICLE

CROSS-REFERENCE TO RELATED APPLICATIONS

This application is a continuation of International Patent Application No. PCT/JP2018/013417 filed on Mar. 29, 2018, the entire disclosures of which are incorporated herein by reference.

BACKGROUND OF THE INVENTION

Field of the Invention

The present invention relates to a straddle type vehicle, and particularly to a straddle type vehicle including a detection unit for detecting surrounding conditions behind the vehicle.

Background Art

In recent years, from the viewpoint of safety, a detection device for detecting surrounding conditions of a vehicle has been equipped on a straddle type vehicle (for example, a two-wheeled vehicle). Japanese Patent Laid-Open No. 2017-171223 discloses a detection device for detecting surrounding conditions ahead of the vehicle equipped below a head light of a two-wheeled vehicle.

In straddle type vehicles, to further improve safety, detecting surrounding conditions behind the vehicle in addition to ahead of the vehicle has become required, and accordingly there is a need of equipping a detection device for detecting surrounding conditions behind the vehicle at an appropriate position where erroneous detection can be prevented.

SUMMARY OF THE INVENTION

The object of the present invention is reducing erroneous detection in a detection device for detecting surrounding environments behind the vehicle.

According to one aspect of the present invention, there is provided a straddle type vehicle, comprising: a taillight disposed in a rear portion of a vehicle and configured to emit light to rearward of the vehicle and a detection unit configured to emit radio waves and detect surrounding conditions behind the vehicle, wherein the taillight includes a light source and a housing for accommodating the light source, the detection unit is provided inside the housing, the housing has a transmitting portion that includes a first region for transmitting light emitted from the light source and a second region for transmitting the radio waves emitted from the detection unit, and the first region has an uneven shape for diffusing the light emitted from the light source, and the second region does not have the uneven shape.

Further features of the present invention will become apparent from the following description of exemplary embodiments with reference to the attached drawings.

DESCRIPTION OF EMBODIMENT

Figure 1:
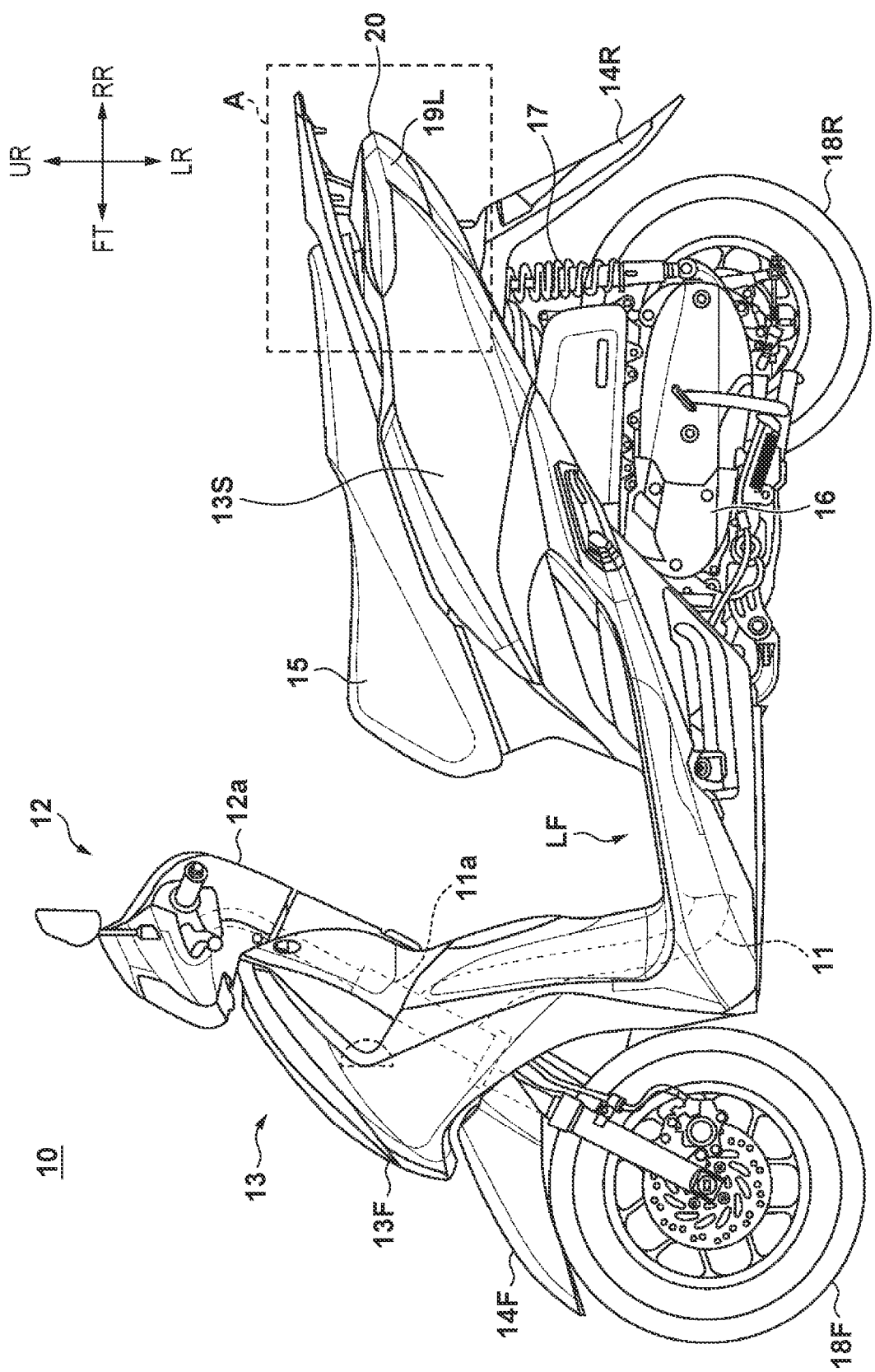
FIG. 1 is a view of a straddle type vehicle as seen from a left side.

The embodiment of the present invention will now be described with reference to the accompanying drawings. The present invention is not limited to the following embodiments, and includes changes and modifications of arrangements within the scope of the present invention. In addition, not all the combinations of features described in the embodiments are necessarily essential to the present invention.

Hereinafter, a straddle type vehicle according to an embodiment of the present invention will be described with reference to the drawings. In the drawings, arrow FR indicates a front-and-rear direction of the vehicle, and FT indicates a front side and RR indicates a rear side. Arrow W indicates a vehicle width direction, and LT indicates a left side and RT indicates a right side as seen in the front-rear direction of the vehicle. Arrow H indicates an up-down direction, and UR indicates an upper side and LR indicates a lower side. Note that the present invention will not be limited to the following embodiment, and encompasses modifications and variations in the configuration within the scope of spirit of the present invention. Moreover, not all combinations of the features described in the present embodiment are necessarily essential to the present invention.

Figure 2:
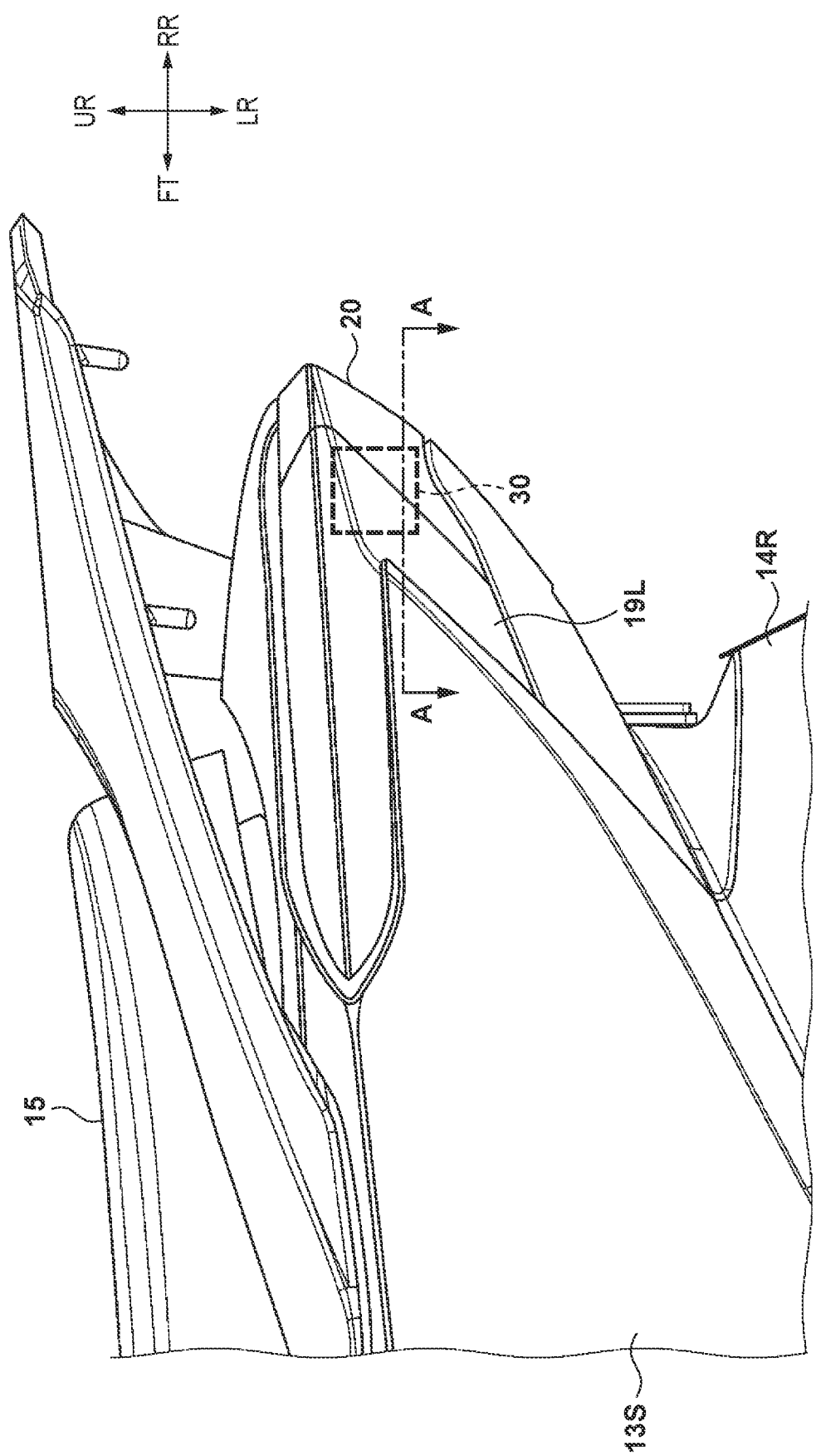
FIG. 2 is an enlarged view of a rear portion of the straddle type vehicle.
Figure 3:
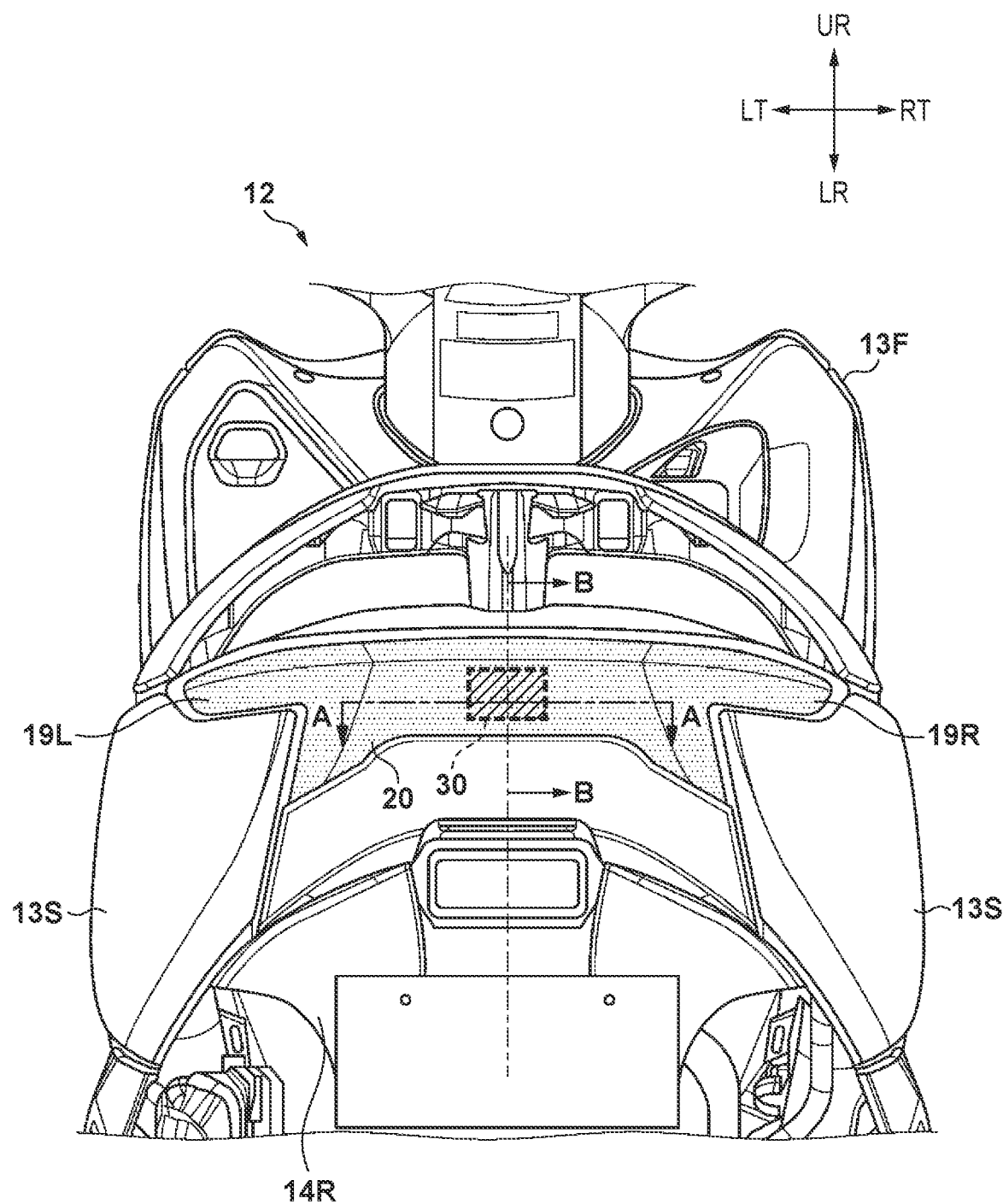
FIG. 3 is a view of the straddle type vehicle as seen from rearward.

FIGS. 1 to 3 are diagrams to show a straddle type vehicle 10 of the present embodiment. FIG. 1 is a view of the straddle type vehicle 10 as seen from the left side, FIG. 2 is an enlarged view of a rear portion (region A in FIG. 1) of the straddle type vehicle 10, and FIG. 3 is a view of the straddle type vehicle 10 as seen from rearward. In the present embodiment, as an example of the straddle type vehicle 10, description will be made on a scooter type motorcycle in which a low floor LF on which driver's feet are to be placed is provided between a steering handle 12 and an occupant seat 15. The straddle type vehicle 10 shown in FIGS. 1 to 3 may include a vehicle body frame 11, a steering handle 12, vehicle body covers 13 (13F, 13S), a front fender 14F, a rear fender 14R, an occupant seat 15, a power unit 16, a rear cushion 17, a front wheel 18F, a rear wheel 18R, and a taillight 20.

The steering handle 12 is pivotally supported by a head pipe 11a provided at a front end of the vehicle body frame 11 so as to be able to steer the front wheel 18F. The steering handle 12 is covered by a handle cowl 12a in which a headlight, a meter equipment and the like are provided, and a front portion of the vehicle body frame 11 such as the head pipe 1a is covered by a front cover 13F. Further, a front fender 14F is provided in front and above the front wheel 18F.

The occupant seat 15 is disposed behind the steering handle 12, and the vehicle body frame 11 below the occupant seat 15 is covered by a side cover 13S. A power unit 16 is provided below the occupant seat 15. The power unit 16 is a unit swing type including an engine and a transmission that changes the output of the engine, and the output of the transmission is transferred to the rear wheel 18R. The power unit 16 and the rear wheel 18R are suspended by a rear cushion 17 connected to the vehicle body frame 11.

In the rear portion of the straddle type vehicle 10, a taillight 20 is provided which lights up in response to driver's brake operation and emits light to rearward of the vehicle. While a specific configuration of the taillight 20 will be described later, the taillight 20 may include a light source 21 that emits light and a housing 22 that accommodates the light source 21. Although the taillight 20 of the present embodiment is configured integrally with left and right blinkers 19R and 19L, the taillight may be configured, without being limited thereto, separately from the left and right blinkers 19R and 19L. Further, below the taillight 20, a rear tender 14R that covers a rear upper portion of the rear wheel is provided.

In recent years, from the viewpoint of safety, the straddle type vehicle 10 has been required to be equipped with a detection unit 30 that detects surrounding conditions of the vehicle 10, and output (notify) information by display or voice to alert the driver or assist its steering operation by a control unit (not shown) such as an ECU depending on the surrounding conditions detected by the detection unit 30. As the detection unit 30, for example, a millimeter wave radar, a laser radar, and a camera can be used. In the present embodiment, an example in which a millimeter wave radar is used as the detection unit 30 will be described.

Such a detection unit 30 may be provided at the front end of the vehicle 10 so as to detect surrounding conditions ahead of the vehicle; however, to further improve safety, there is need of providing the detection unit 30 at the rear end of the vehicle 10 as well. On the other hand, in the detection unit 30 (for example, a millimeter wave radar), if an object other than a detection target, such as a metal member, which does not easily transmit radio waves (millimeter waves), is present within the emission range of the radio waves, erroneous detection is more likely to occur due to the influence of the object. Therefore, it is preferable to dispose the detection unit 30 such that other members of the vehicle 10 that are less likely to transmit radio waves are not present on the rearward side (on the emission direction side of radio waves) with respect to the emission surface 31 of radio waves. Further, since the detection unit 30 is likely to cause erroneous detection when it is close to the road (road surface), it is preferable to dispose the detection unit 30 at a position as far as possible from the road (road surface).

Accordingly, in the straddle type vehicle 10 of the present embodiment, the detection unit 30 for detecting surrounding conditions behind the vehicle is disposed inside the housing 22 of the taillight 20 as shown by the dashed lines in FIGS. 2 and 3. Since, as a result of disposing the detection unit 30 in this manner, other members of the vehicle 10 that do not easily transmit radio waves are not disposed in the emission direction of the radio wave from the detection unit 30 (that is, on the vehicle rearward side with respect to the emission surface 31 of radio waves), it is possible to avoid erroneous detection caused by the other members. Further, since the detection unit 30 can be disposed to be spaced apart from the road (road surface), erroneous detection due to the influence of the road can also be reduced (prevented).

Figure 4:
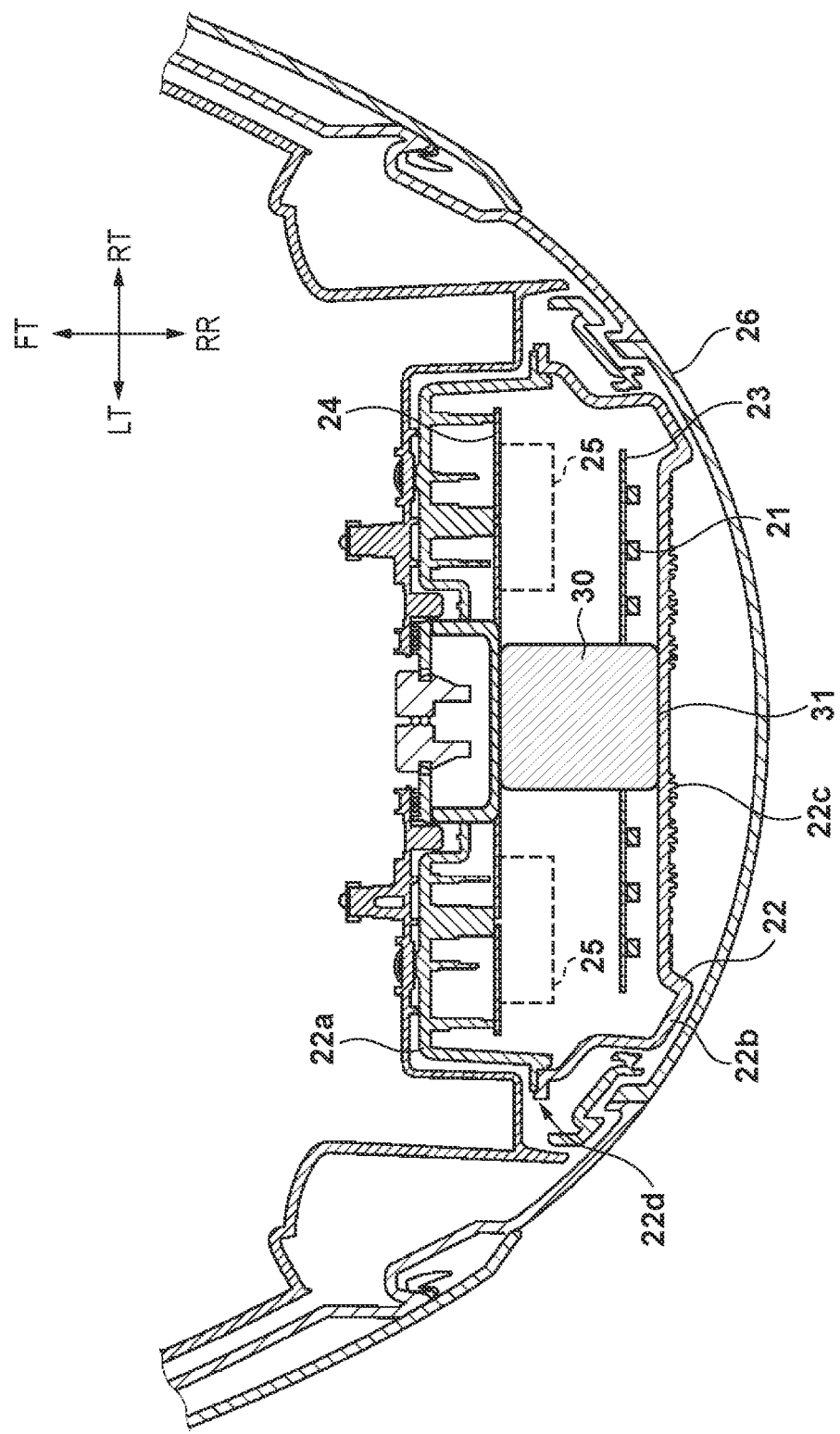
FIG. 4 is a sectional view (sectional view taken along a line A-A of FIG. 3) of a vehicle rear portion.
Figure 5:
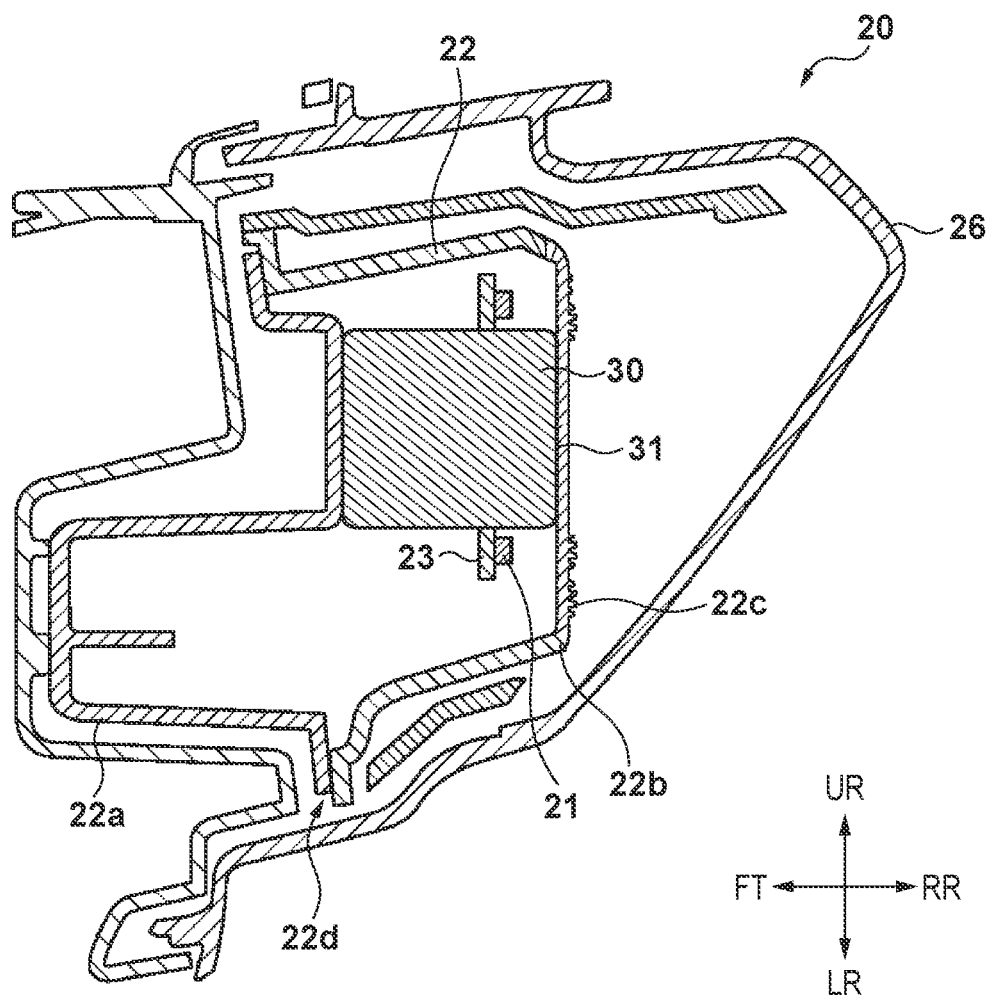
FIG. 5 is a sectional view (sectional view taken along a line B-B of FIG. 3) of the vehicle rear portion.

Hereinafter, a specific layout example of the detection unit 30 will be described with reference to FIGS. 4 to 5. FIGS. 4 to 5 are sectional views of a vehicle rear portion including the taillight 20. FIG. 4 shows a sectional view taken along a line A-A of FIG. 3, and FIG. 5 shows a sectional view taken along a line B-B of FIGS. 2 and 3.

The taillight 20 includes a plurality of light sources 21 that emit light, and a housing 22 that accommodates the plurality of light sources 21, and may be covered by a cover member 26 from rearward of the vehicle as shown in FIG. 4. The cover member 26 can be made of a material that transmits light emitted from each light source 21, and that also easily transmits radio waves emitted from a millimeter wave radar, such as a resin material or a plastic material.

The plurality of light sources 21 in the taillight 20 are installed on a first board 23 at intervals in the vehicle width direction and the vehicle up-down direction, and the light emission of each is controlled by the driver unit 25 installed on the second board 24. As each light source 21, for example, an LED may be used. Moreover, the housing 22 may include a base 22a to which the first board 23 (light source 21) and the second board 24 are attached, and a lens portion 22a that transmits the light emitted from each light source 21.

The base 22a is connected to the vehicle body frame 11 via a support stay. The support stay is made of, for example, a metal material, and is fixed to the vehicle body frame 11 with a screw or the like. The base 22a may be fixed to the vehicle body frame 11 (support stay) via a vibration reducing member. The vibration reducing member is a member capable of reducing the vibration transmitted from the vehicle body frame 11 to the base 22a, and for example, a rubber mount or the like can be used therefor. The lens portion 22b is made of a material such as a resin material or a plastic material that easily transmits radio waves emitted from the millimeter wave radar, and has an uneven shape 22c for diffusing the light emitted from each light source 21. By joining the base 22a and the lens portion 22b at a joining portion 22d, it is possible to form the inside of the housing 22 into a substantially sealed space, and thereby prevent water, dust, and the like from flowing into the inside of the housing.

The detection unit 30 is disposed inside the housing 22 of the taillight 20 as shown in FIGS. 4 and 5. The detection unit 30 may be disposed so as to be interposed among the plurality of light sources 21 in at least one of the vehicle width direction and the vehicle up-down direction. Preferably, the detection unit 30 may be disposed so as to be surrounded by the plurality of light sources 21 in both the vehicle width direction and the vehicle up-down direction (that is, a plane direction perpendicular to the vehicle longitudinal direction). Here, in the housing 22 inside of which the detection unit 30 is provided, it is preferable from the viewpoint of reducing erroneous detection that the rear portion of the detection unit 30 (emission surface 31) in the lens portion 22b is a flat plane without the uneven shape 22c.

Further, as described above, the detection unit 30 becomes more likely to cause erroneous detection if a member (for example, a metal member) that does not easily transmit radio waves is present on the rearward side with respect to the emission surface 31 of radio waves. Therefore, it is preferable to dispose the detection unit 30 such that other members that do not easily transmit radio waves in the housing 22 are not disposed on the vehicle rearward side with respect to the rear end (emission surface 31) of the detection unit 30 in the vehicle longitudinal direction. Preferably, the detection unit 30 may be disposed such that among the components provided inside the housing 22, the rear end (emission surface 31) of the detection unit 30 is located at a rearmost position.

Figure 6A:
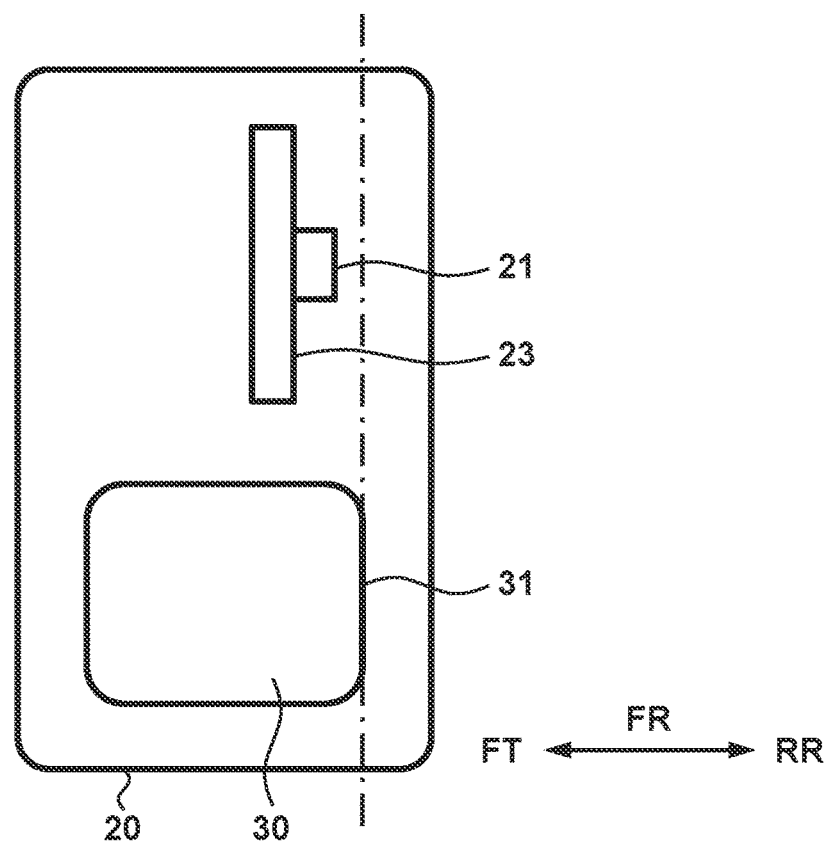
FIG. 6A is a diagram to illustrate the disposition of a detection unit in a taillight.
Figure 6B:
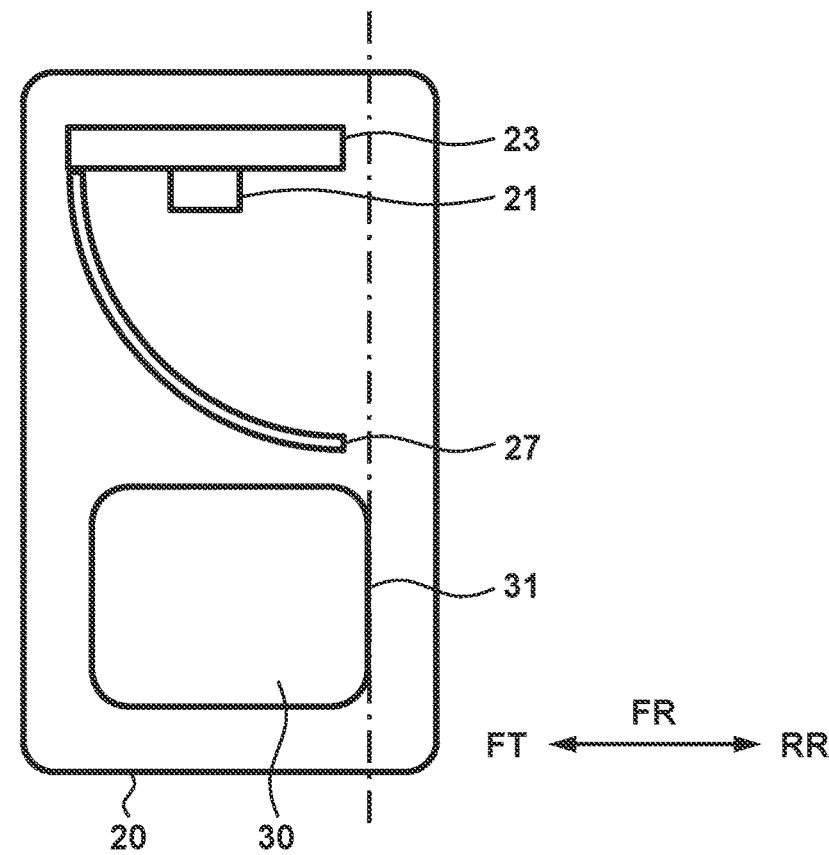
FIG. 6B is a diagram to illustrate the disposition of the detection unit in the taillight.

FIGS. 6A and 6B are diagrams to illustrate the disposition of the detection unit 30 inside the housing 22. FIG. 6A shows a taillight (so-called direct-emission type taillight 20a) in which light from the light source 21 is directly emitted from the lens portion 22b without interposing anything therebetween. FIG. 6B shows a taillight (so-called reflection type taillight 20b) based on a scheme in which a reflector 27 that reflects the light from the light source 21 toward rearward of the vehicle is provided in the housing 22, and the light is reflected by the reflector 27 and thereafter emitted from the lens portion 22b.

In the direct-emission type taillight 20a, as shown in FIG. 6A, the detection unit 30 may be disposed such that the rear end (emission surface 31) of the detection unit 30 is located at the same position as the rear end of the light source 21, or on the vehicle rearward side with respect to the rear end of the light source 21, in the vehicle longitudinal direction. On the other hand, in the reflection type taillight 20b, as shown in FIG. 6B, the detection unit 30 may be disposed such that the rear end (emission surface 31) of the detection unit 30 is at the same position as the rear ends of the light source 21, the first board 23, and the reflector 27, or on the vehicle rearward side with respect to the rear ends thereof, in the vehicle longitudinal direction.

The detection unit 30 may be attached to the base 22a of the housing 22 or the lens portion 22b. For example, when the detection unit 30 is attached to the base 22a, since the base 22a is supported by the vehicle body frame 11, it is possible to increase the attaching rigidity between the detection unit 30 and the vehicle 10, as well as to suppress fluctuations in the detection angle of the detection unit 30 due to vibration. On the other hand, when the detection unit 30 is attached to the lens portion 22b, since the lens portion 22b can be attached (assembled) to the base 22a after the detection unit 30 is attached to and integrated with (assembled with) the lens portion 22b, it is possible to improve the assemblability (easiness of assembling) of the taillight 20 including the detection unit 30 inside.

As described above, in the straddle type vehicle 10 of the present embodiment, the detection unit 30 that detects surrounding conditions behind the vehicle is provided inside the taillight 20 (that is, inside the housing 22 that accommodates the light source 21). As a result, it is possible to reduce the possibility that the detection unit 30 may cause erroneous detection, thereby improving safety. Moreover, since the inside of the housing 22 is excellent in waterproofness and dustproofness, the detection unit 30 can be protected from the influences of water, dust, and the like.

Summary of Embodiments

1. A straddle type vehicle of the above described embodiment includes
    a taillight (20) that is disposed at a rear portion of a Vehicle (10) and emits light to rearward of the vehicle; and
a detection unit (30) for detecting surrounding conditions behind the vehicle, characterized in that
    the taillight includes a light source (21) and a housing (22) for accommodating the light source, and
    the detection unit is provided inside the housing.

According to this embodiment, since the detection unit is provided inside the taillight (that is, inside the housing that accommodates the light source), it is possible to reduce erroneous detection caused by an object other than the detection target being present within an emission range of radio waves, and erroneous detection caused by the road (effects of the road surface), thereby ensuring detection performance and enabling detection of a wide-angle range. Further, with such a configuration, since the inside of the housing 22 is excellent in waterproofness and dustproofness, it becomes possible to protect the detection unit 30 from influences of water, dust, and the like (that is, waterproofing/dustproofing effect is obtained). Furthermore, with such a configuration, it becomes possible to reduce vibration of the detection unit and ensure accuracy of emission angle (radiation angle) of the radio wave from the detection unit, compared to a case where the detection unit is installed in an area other than the taillight, such as an outer cover and a fender.

2. In the above described embodiment,
    the detection unit is disposed such that a rear end thereof is located at a same position as a rear end of the light source, or on a vehicle rearward side with respect to the rear end of the light source, in a vehicle longitudinal direction.

According to this embodiment, since the detection unit is disposed such that the a end thereof is disposed at the same position as the rear end of the light source, or on the vehicle rearward side with respect to the rear end of the light source, in the vehicle longitudinal direction, it becomes possible in the detection unit to reduce erroneous detection due to the influence from other members of the vehicle, further enabling to ensure detection performance and detect a wide-angle range.

3. In the above described embodiment,
    the taillight further includes a reflector (27) that reflects light from the light source toward rearward of the vehicle, and
    the detection unit is disposed such that a rear end thereof is located at a same position as a rear end of the reflector, or on a vehicle rearward side with respect to the rear end of the reflector, in a vehicle longitudinal direction.

According to this embodiment, since the detection unit is disposed such that the rear end thereof is located at the same position as the rear end of the reflection plate that reflects the light from the light source toward rearward of the vehicle, or on the vehicle rearward side with respect to the rear end of the reflector in the vehicle longitudinal direction, it becomes possible in the detection unit to reduce erroneous detection due to influences of other members of the vehicle, thus further enabling to ensure detection performance and to detect a wide-angle range.

4. In the above described embodiment,
    the housing includes a base (22a) to which the light source is attached, and a lens portion (22b) that is joined with the base and transmits light emitted from the light source, and
    the detection unit is attached to the base.

According to this embodiment, since the detection unit is attached to the base of the housing to which the light source is attached, it is possible to increase attaching rigidity between the detection unit and the vehicle, as well as to suppress fluctuation of the detection angle of the detection unit due to vibration.

5. In the above described embodiment,
    the housing includes a base (22a) to which the light source is attached, and a lens portion (22b) that is joined with the base and transmits light emitted from the light source, and
    the detection unit is attached to the lens portion.

According to this embodiment, since the detection unit is attached to the lens portion of the housing that transmits the light emitted from the light source, it is possible to unite the lens portion with the base after the detection unit is attached to the lens portion at the time of assembling the taillight, thereby improving assemblability.

6. In the above described embodiment,
    the base is connected to a vehicle body frame (11).

According to this embodiment, since the base of the housing is connected to the vehicle body frame, it is possible to increase the attaching rigidity between the detection unit and the vehicle, as well as to suppress fluctuation of the detection angle of the detection unit due to vibration.

7. In the above described embodiment, the taillight is configured such that light from the light source is directly emitted from the lens portion.

According to this embodiment, since the taillight is configured such that light from the light source is directly emitted from the lens portion of the housing, it is possible to reduce a length of the taillight in the vehicle longitudinal direction, thus reducing the size of the taillight as well as ensuring vibration resistance.

8. In the above described embodiment, the taillight includes a plurality of the light sources, and the detection unit is disposed so as to be interposed among the plurality of the light sources in at least one of a vehicle width direction and a vehicle up-down direction.

According to this embodiment, since the detection unit is arranged so as to be interposed among the plurality of light sources in at least one of the vehicle width direction and the vehicle up-down direction, it is possible to achieve both the detection performance of the detection unit and the visibility of the taillight at the same time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A straddle type vehicle having a front and a rear, wherein a first direction comprising rearward extends from the front to the rear of the straddle type vehicle, and a second direction comprising forward extends from the rear to the front of the straddle type vehicle, the straddle type vehicle comprising:

a taillight disposed in a rear portion of the straddle type vehicle and configured to emit light rearward from the straddle type vehicle; and a detector configured to emit radio waves and detect surrounding conditions behind the straddle type vehicle, wherein the taillight includes a housing and a plurality of light sources accommodated in the housing, the housing consisting of a base to which the plurality of light sources are attached and a lens portion that is joined with the base and transmits light emitted from the plurality of light sources, the detector is provided inside the housing and attached to the lens portion, the lens portion is configured by a single member, and includes a first region for transmitting light emitted from the plurality of light sources and a second region for transmitting the radio waves emitted from the detector, and the first region has an uneven shape for diffusing the light emitted from the plurality of light sources, and the second region does not have the uneven shape, and the detector is disposed such that a rear end of the detector is located further rearward than to a rear end of the plurality of light sources, and such that a front end of the detector is located further forward than a front end of the plurality of light sources, and the detector is disposed so as to be interposed among the plurality of the light sources in at least one of a vehicle width direction and a vehicle up-down direction.

2. The straddle type vehicle according to claim 1, wherein the taillight further includes a reflector that reflects light from the plurality of light sources toward rearward of the straddle type vehicle, and the detector is disposed such that the rear end of the detector is located at a same position as a rear end of the reflector, or on a vehicle rearward side with respect to the rear end of the reflector, in the vehicle longitudinal direction.

3. The straddle type vehicle according to claim 1, wherein the base is connected to a vehicle body frame.

4. The straddle type vehicle according to claim 1, wherein the taillight is configured such that light from the plurality of light sources is directly emitted from the lens portion.

5. The straddle type vehicle according to claim 1, wherein the second region is a flat plane without the uneven shape.

6. The straddle type vehicle according to claim 1, wherein the lens portion of the housing is configured as a single-plate structure.

7. The straddle type vehicle according to claim 1, further comprising a rear fender disposed beneath the taillight to cover a rear upper portion of a rear wheel of the straddle type vehicle.

8. The straddle type vehicle according to claim 1, wherein the straddle type vehicle is a motorcycle.

* * * * *